United Sta[tes Patent]
Keneman et al.

[11] 3,747,075
[45] July 17, 1973

[54] ELECTRO-OPTICAL STORAGE DEVICE
[75] Inventors: Scott Allen Keneman, Hightstown; George William Taylor, Princeton, both of N.J.
[73] Assignee: RCA Corporation, New York, N.Y.
[22] Filed: Apr. 3, 1970
[21] Appl. No.: 25,397

[52] U.S. Cl.. 340/173 LT, 340/173.2, 340/173 LM, 250/219 Q
[51] Int. Cl............................................. G11c 11/22
[58] Field of Search................. 340/173.2, 173 LM, 340/173 LT, 173 LS; 350/150; 250/219 Q

[56] References Cited
UNITED STATES PATENTS
3,609,002  9/1971  Fraser et al...................... 340/173.2
3,374,473  3/1968  Cummins......................... 340/173.2
3,643,233  2/1972  Fan et al........................... 340/173.2
3,319,235  5/1967  Chang et al.................. 340/174 YC FOREIGN PATENTS OR APPLICATIONS
873,897  8/1961  Great Britain.................. 340/173.2

OTHER PUBLICATIONS
Bell System Technical Journal, "Image Storage & Display Devices Using Fine-Grain, Ferroelectric Ceramics" by Meitzler et al., July–Aug. 1970, pages 953–967.

Primary Examiner—Stanley M. Urynowicz, Jr.
Attorney—Glenn H. Bruestle, M. Epstein et al.

[57] ABSTRACT

An electro-optical material body has two opposed surfaces, each covered with a transparent photoconductive material layer covered, in turn, with a transparent conductive electrode. Although not necessary, in a preferred method of operation, information is written into the body using light which is directed onto the body surfaces at an angle of inclination which is the same as that used with the light used to read information from the device. In a different embodiment, one surface of the body is covered by a transparent photoconductive material layer covered, in turn, by a transparent electrode, while the other surface of the body has a plurality of spaced electrodes thereon.

6 Claims, 6 Drawing Figures

PATENTED JUL 17 1973 3,747,075

INVENTOR.
SCOTT A. KENEMAN &
GEORGE W. TAYLOR
BY M.Y. Epstein
ATTORNEY

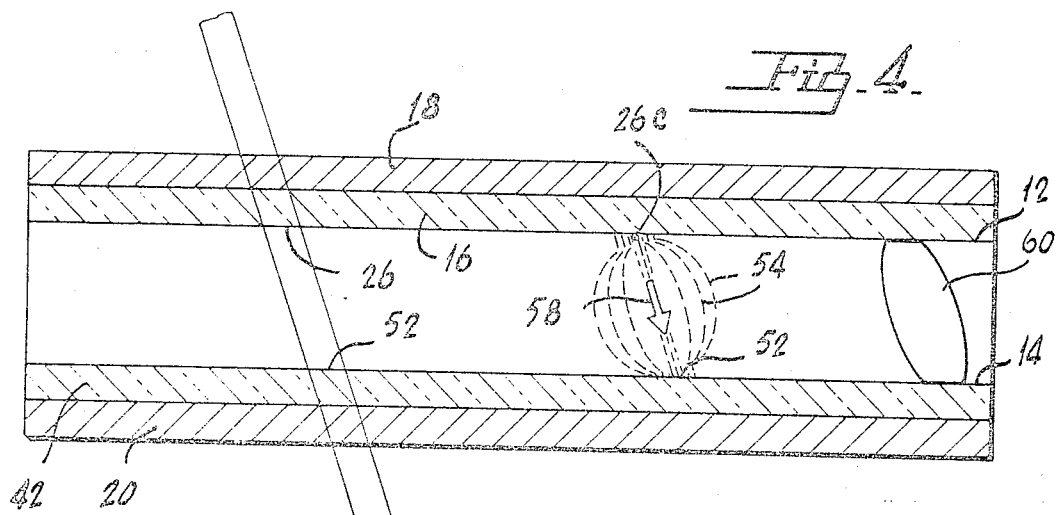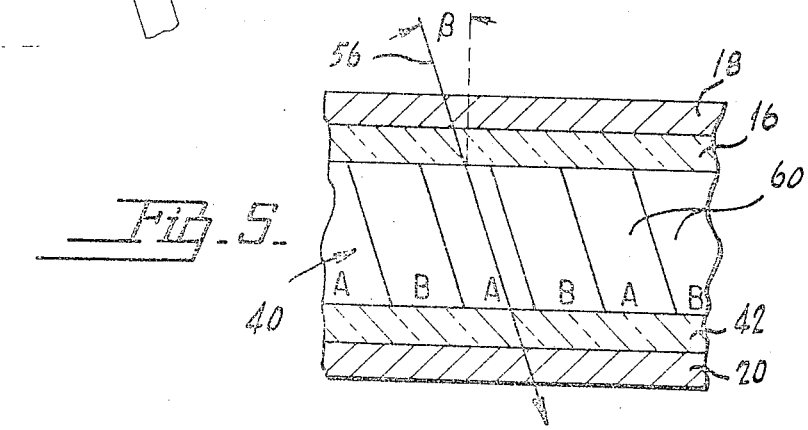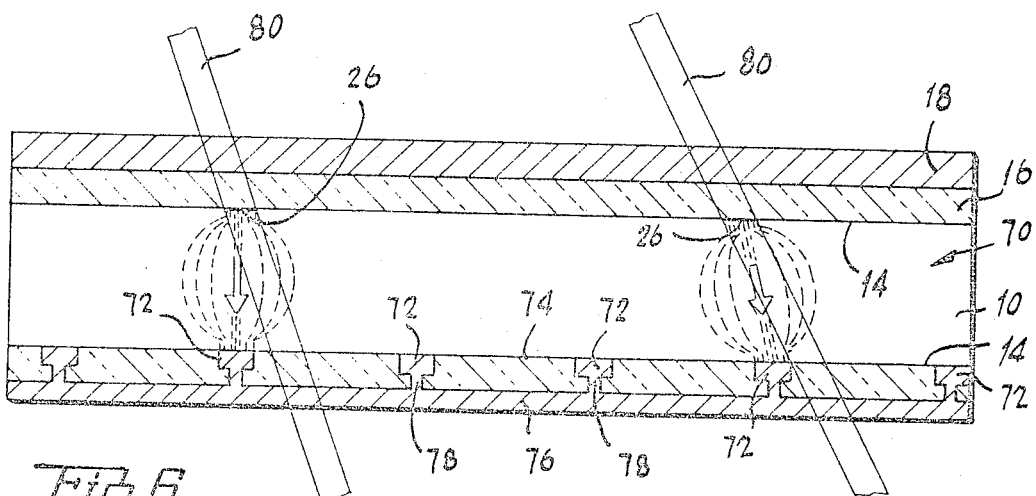

ELECTRO-OPTICAL STORAGE DEVICE

BACKGROUND OF THE INVENTION

The invention herein disclosed was made in the course of or under a contract or subcontract thereunder with the Department of the Air Force.

This invention relates to optical storage devices comprising electro-optical materials. By electro-optical is meant crystalline materials containing electrically polarizable domains having optical properties.

In such devices, optical information is stored as one of two remanent polarization states between which individual elemental regions or domains of an electro-optical material, e.g., a ferroelectric material, can be switched by the momentary application of an electric field, and is read from the device using optical means. In one form of such devices, a ferroelectric material body has two major, opposed parallel surfaces. One of the surfaces is covered with a photoconductive material, covered, in turn, by a first transparent electrode, and the other surface is covered by a second transparent electrode.

Write-in of information is accomplished by applying a voltage between the two electrodes and directing a pattern of light onto the photoconductive material side of the body. The light, where it falls on the photoconductive material, reduces the otherwise high electrical resistivity of the photoconductive material. This results in the application of an electric field through the ferroelectric body in a pattern corresponding to the pattern of the incident light, and an attendant polarization to one of the two remanent states of those ferroelectric domains which are within the electrc field.

Read-out of information is accomplished by shining light through the ferroelectric material through crossed polarizers. By proper selection of the polarizer axes relative to the domain axes, light will either pass through or be blocked by the combination of polarizers and ferroelectric material depending upon the remanent polarization state of the domains of the ferroelectric material through which the light passes.

Owing to such factors as fringing electric fields within the ferroelectric body, and the need for utilizing angled light rays in the read-out of information, such factors being described hereinafter, a problem with the prior art devices is that of obtaining good optical resolution, i.e., high density storage and read-out of optical information.

DESCRIPTION OF THE DRAWINGS

FIGS. 3 through 6 are cross-sectional views illustrating details of and the operation of devices according to the instant invention.

DETAILED DESCRIPTION OF PREFERRED EMBODIMENTS

The basic principles of operation, and examples of one type of prior art electro-optical storage device using a ferroelectric material, are provided in U.S. Pat. No. 3,374,473, issued to S. E. Cummins on Mar. 19, 1968.

Figure 1:
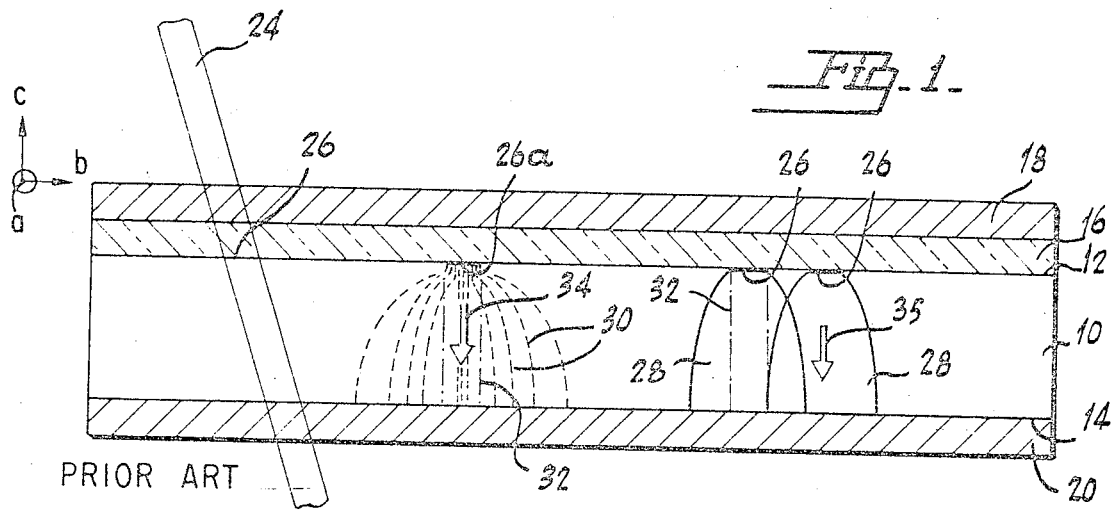
FIGS. 1 and 2 are cross-sectional views illustrating details of and the operation of prior art devices.

With reference to FIG. 1 herein, the ferroelectric material portion of a prior art information storage system is shown. The ferroelectric material 10, which can be single crystal bismuth titanate ($Bi_4Ti_3O_{12}$) as a preferred material, is in the form of a flat plate having two major, opposed parallel surfaces 12 and 14. Other known ferroelectric materials, such as single crystal trigonal boracites, single crystal gadolinium molybdate or fine or coarse grained lead-zirconate-titanate (PZT) ceramics, can be used. Covering the surface 12 is a layer 16 of a light transmitting (e.g., 50 percent light transparent) photoconductive material, e.g., zinc selenide or cadmium sulfide, covered, in turn, by a layer 18 of a transparent, electrically conductive material, e.g., tin oxide. Covering the other surface 14 of the crystal 10 is a transparent, electrically conductive layer 20 similar to the conductive layer 18. The two layers 18 and 20 comprise electrodes for the crystal 10 across which a voltage is applied in use of the device.

The applied voltage is of such magnitude as to be capable, when applied across the crystal 10, of switching elemental areas or domains of the crystal between two polarization states, between the polarity of the applied voltage. Owing to the presence of the photoconductive layer 16, of high electrical resistance when not illuminated, the applied voltage is insulated from the crystal 10, causing no polarization reversal of the domains thereof, until low resistance paths through the layer 16 are created by the illumination of the layer 16. This is described hereinafter.

The crystallographical orientation of the crystal 10 is selected, in a manner disclosed in the aforementioned patent, such that the application of an electric field of one polarity through the crystal 10, via the electrodes 18 and 20, results in a polarization of the crystal domains within the electric field, i.e., a shifting of the optical characteristics of the domains within the field to a particular one of two stable optical states. Reversing the electric field causes the domains in the field to be polarized to the other of the optical states. By "domain" is meant the smallest region of the crystal which can be alternately polarized, independently of adjoining domains, by the application of an electric field thereto. Once set in one of the two polarized states, the crystal domains remain in that state upon removal of the electric field. Also, the polarizing effect is voltage-time dependent, i.e., the shorter the period the electric field is applied across the crystal, the greater the strength of the field must be to cause polarization of the domains.

In use of the device, information is written into the device by projecting a pattern of light onto the electrode 18 side of the crystal 10. For convenience of illustration and description, the writing light is shown as a small diameter, circular beam 24, i.e., "a pencil" light beam. The angle of incidence of the writing beam 24 with the surface 12 of the crystal 10 is immaterial. Also, the bending of the beam 24 at the various material interfaces is not shown.

Where the light beam 24 passes through the photoconductive layer 16 the electrical resistance thereof is significantly reduced, whereby the voltage on the electrode 18 is applied to the crystal surface 12 at an area 26 intersected by the light beam 24. That is, the area 26, defined by the light beam 24, acts as an elemental electrode on the surface 12 of the crystal 10, whereby an electric field is established through the crystal 10 between the elemental electrode 26 and the electrode 20 on the other surface 14 of the crystal 10.

The electric field associated with one elemental electrode 26a is indicated by the use of dash lines 30 representing some of the electric field lines (the writing beam 24 giving rise to the electrode 26a not being shown for greater clarity). As known, the strength of an electric field at any point is approximately inversely related to the length of the particular electric field line passing through the point. As shown in FIG. 1, the ends of the field lines terminate at the elemental electrode 26a and diverge as they extend through the crystal to terminate at the electrode 20. The further the lateral distance of the lines from the electrode 26a, the greater is the length of the lines, indicating that the strength of the electric field decreases with lateral distance from the electrode 26a.

Depending upon the magnitude and duration of the applied voltage, various domains within those portions of the electric field of sufficient strength to polarize the domains are polarized to one of the two polarization states. The group of polarized domains, adjacent to one another and disposed within a "region" of the crystal, correspond to a single bit of stored information. Two such regions, referred to hereinafter as information bit regions, are designated by the numeral 28 in FIG. 1.

A problem with the prior art devices is that while the strongest electric field is within a projection of the elemental electrode 26a, (the projection area being designated by the dash-dot lines 32), the strength of the electric field outside this projection region, referred to hereinafter as the "fringing" electric field, falls off relatively slowly with lateral distance from the elemental electrode 26a. That is, the rate of increase of the length of the field lines 30 shown in FIG. 1 is ralatively small with increasing lateral distance of the lines from the electrode 26a. The effect of this strong fringing field is that various domains, laterally spaced from the electrode 26a, are likely to be polarized. To the extent that the fringing electric field polarizes domains laterally spaced from the elemental electrodes 26, thereby increasing the width of the information bit regions 28, the resolution of the device is limited. That is, each elemental electrode, corresponding to one information bit, must be spaced at least sufficiently far from the other elemental electrodes 26, as shown to the right of FIG. 1, such that no overlapping of the information bit regions 28 occurs within the projection areas of the electrodes 26. If such overlapping did occur, information written into the device at one point could be erased by information written into the device at an adjacent point.

A further limitation on the optical resolution of the prior art devices arises from the fact that the axis of the electric field, indicated by the arrow 34 in FIG. 1, between the elemental electrode 26a and the electrode 20 is perpendicular to the crystal surfaces 12 and 14. Thus, the axis of each information bit region 28, indicated by the arrow 35 in FIG. 1, is also perpendicular to the crystal surfaces.

As described in the aforementioned patent, information read-out is accomplished by placing the crystal between crossed polarizers, directing light through the polarizers and crystal, and detecting the pattern of light which emerges from the system. That is, light passing through crystal domains in one state of remanent polarization is so optically polarized as to pass through the system, while the light passing through the domains in the other remanent polarization state is so optically polarized as to be blocked by the system.

The further limitation on the optical resolution of the prior art devices arises by virtue of the fact that the reading light, to distinguish between domains in different polarized states, must be directed through the crystal at some angle, dependent upon the particular crystal material, other than 90° to the crystal major surfaces 12 and 14. For a crystal 10 of bismuth titanate, for example, having three axes $a$, $b$, and $c$, as indicated to the left of FIG. 1, the angle of the reading light is preferably between 10° and 30° from the $c$ axis, i.e., the normal to the crystal surfaces. No inclination of the reading light relative to the a axis is required. The effect of the use of an inclined reading light is described in connection with FIG. 2.

For purposes of illustration, th reading light is shown as a line beam 36 having no thickness, the beam 36, within the crystal 10, being at an angle $\beta$ to the normal to the crystal surface 14. Also, the crystal 10 is shown containing alternating information bit regions A and B each containing uniformly polarized domains, the polarization state of the domains of the regions A being the opposite of the polarization state of the domains of the regions B. Also, for purposes of illustration, the effects of field fringing are ignored, the various regions having the minimum width possible for the size of the writing beam used, and the regions being shown contiguous to one another for miximum information storage. Finally, as previously noted, the axis of each information bit region A and B is perpendicular to the crystal surfaces.

Thus, in the instant illustrated case, owing to the high density of the stored information, the angle of the reading beam 36, and the size of the various regions, the reading beam 36, which is not parallel to the axes of the regions A and B, passes through two adjoining regions A and B. Since each region corresponds to one bit of information, the information stored in either the A or B regions, or both, cannot be detected.

To avoid this situation, the various regions A and B must be at least as wide (or spaced from one another a distance at least as great) as the lateral distance R traversed by the reading beam during its passage through the crystal. This is so in order that the reading light can pass through the crystal without intercepting two different information bit regions. This distance $R$, which is a limitation on the optical resolution of the prior art systems, is given, approximately, for small angles of $\beta$, by the equation:

$$R = T\beta$$

where: $T$ is the thickness of the crystal 10, and $\beta$ is the angle of inclination (in radians), within the crystal 10, of the reading beam 36 relative to the c axis of the crystal.

In one prior art system, for example, the thickness T of the crystal 10, of bismuth titanate, is 100 microns, and $\beta$ is approximately 0.067 radian. The resolution limit R of such system is thus, approximately, 6.7 microns.

In accordance with the instant invention, the resolution limit of the system is significantly improved, as now described.

Figure 2:
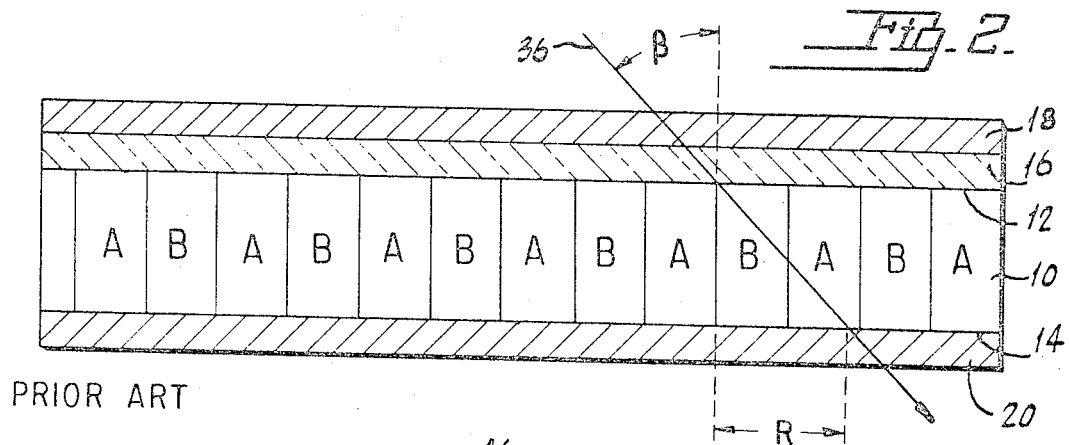
Figure 3:
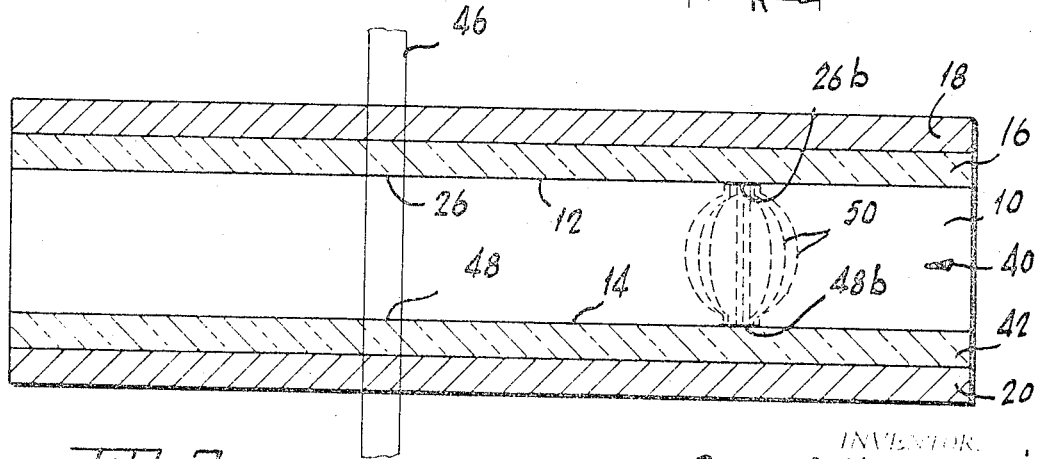

With reference to FIG. 3, an improved device 40 is shown which is substantially identical to the prior art device shown in FIGS. 1 and 2, with the exception of the presence of a second light transmitting photoconductive layer 42 disposed on the surface 14 of the crystal 10 beneath the electrode 20.

In one utilization of the device 40, information is written into the device using a writing light, a "pencil" beam 46, in the instant embodiment, which is perpendicular to the crystal surfaces 12 and 14. In the write-in process, the perpendicular light beam 46 is not refracted as it passes through the various materials of the device, and the beam of light passes entirely through the device in the normal direction. Where the light passes through the two photoconductive layers 16 and 42, low electric resistance paths are created, thereby giving rise to two elemental electrodes 26 and 48 at the two surfaces 12 and 14 of the crystal 10, respectively.

The electric field between one pair of electrodes 26b and 48b is indicated by the use of dash lines 50 representing some of the electric field lines. Owing to the fact that the field lines are forced to terminate at relatively small elemental electrodes, the field lines cannot merely diverge continuously from one another, as in the prior art device shown in FIG. 1, but must reconverge at each electrode 26b and 48b. Thus, in comparison with the electric field of the prior art device, the field lines 50 follow more curved paths and increase in length more rapidly with increasing lateral distance of the lines from the electrode 26b. That is, the strength of the electric field of the device shown in FIG. 3 falls off more rapidly with increasing lateral distance from the elemental electrode 26b than does the electric field of the prior art device. Thus, with otherwise identical writing beams, applied voltage, and material thickness, the width of the information bit regions formed in the device 40 is substantially smaller than the width of the information bit regions of the prior art device.

Experiments have shown, for example, that the difference in width of the information bit regions is at least as great as a factor of 5, and in some instances, as high as a factor of 10. The optical resolution of the device 40 is improved, in comparison with the prior art devices, in direct relation to the reduction in width of the information bit regions.

In another utilization of the device 40, as illustrated in FIG. 4, the write-in of information into the device is performed using light rays that are directed through the crystal 10 at an inclination identical to the inclination at which the reading light is directed through the crystal, the reading light inclination, as previously noted, being dependent on the ferroelectric material being used.

Thus, as a result of the use of an inclined writing beam, the two elemental electrodes 26c and 52 at the opposite surfaces 12 and 14, respectively, of the crystal which are produced by the writing beam are laterally offset from one another. Some of the electric field lines of the electric field between two electrodes 26c and 52 at the right of the crystal 10 are represented by dash lines 54. As is the case with the device 40 shown in FIG. 3, the ends of the electric field lines are forced to terminate close to one another. Thus, the strength of the electric field, as compared with the described prior art device, falls off rapidly with lateral distance from the electrode 26c. In the FIG. 4 embodiment, as compared with the FIG. 3 embodiment, however, the axis of the electric field, indicated by the arrow 58, in FIG. 4, is inclined to the crystal surfaces at an angle equal to the angle of inclination of the writing beam. As a result, the axis of the information bit region 60, shown at the right of the crystal, is not disposed normal to the crystal major surfaces, as in the prior art device shown in FIG. 1, but is at an inclination parallel to the paths through the crystal of both the writing and reading rays of light.

The effect of the inclination of the information bit regions 60 is illustrated in FIG. 5. In the figure, a device 40 is shown containing alternate regions A and B of stored information, the different regions being contiguous to one another for maximum information storage, and the polarization state of the domains of the regions A being the opposite of the polarization state of the domains of the regions B. Also, as in the description of the prior art device, the effects of field fringing are ignored.

The reading light, a light beam 56 having no thickness, for purposes of illustration, passes through the crystal at some inclination determined by the particular ferroelectric material being used. As previously noted, however, the axes of the various regions A and B are parallel to the path of the reading light beam, whereby there is virtually no possibility of the reading beam passing through two adjacent regions A and B. Thus, no resolution limit, as in the prior art device, arises by virtue of the need to use an inclined reading beam, and, ignoring the effects of fringing fields, the regions A and B can be as narrow and close together as possible for the writing beam used.

In another embodiment, not illustrated, the conductive electrode 20 is not transparent, but has a light reflective surface facing the crystal 10. The device can be operated as the device 40, as described above, but with the provision that the writing beam is of such character, i.e., with respect to intensity or wave length, as to be substantially completely absorbed in a single passage through the two photoconductive layers 16 and 42. That is, the writing beam is not reflected by the reflective surface.

The reading beam, however, is of such character as to be reflected back out of the device through the layers 16 and 18, and through a pair of crossed polarizers disposed at the surface 12 side of the crystal.

Preferably, the information bit regions written into this device are of such width that the reading light passes through the same region twice on its round trip through the crystal. An advantage of this arrangement is that the optical effect on the light is doubled, thereby facilitating the detection process.

Another embodiment of the instant invention is shown in FIG. 6. In this embodiment, the device 70 comprises a crystal 10 having a photoconductive layer 16 convered by an electrode layer 18 as in the other devices described above. Disposed in spaced relation along the lower surface 14 of the crystal 10, however, are a plurality of transparent elemental electrodes 72 of, for example tin oxide. Covering the electrodes 72, and the crystal surface 14 between the electrodes, is a transparent layer 74 of an insulating material preferably having a low dielectric constant and a high resistivity, for example, silicon dioxide. Disposed on the layer 74 is a transparent electrode 76 of, for example, tin oxide, connected to each of the electrodes 72 by means of links 78 extending through openings through the layer 74. A voltage is applied between each electrode 72 and the electrode 18 on the other surface of the crystal 10 by connecting a voltage source (not shown) between the electrodes 18 and 76.

The device 70 has particular utility in applications where the pattern of the writing light on the crystal 10 is fixed, and the device 70 is used to record either the presence of or absence of portions of the light pattern.

Thus, for example, as shown to the left side of the crystal 10, an electrode 72 is disposed directly beneath an elemental electrode 26 formed by a writing light beam 80. In this embodiment, the angle of the writing beam relative to the crystal is immaterial. The electric field between the elemental electrode 26 and the electrode 72 is relatively confined therebetween, whereby fringing of the electric field is reduced.

Alternatively, as shown to the right side of the crystal 10, an electrode 72 is disposed laterally offset from the elemental electrode 26, whereby the main axis of the electric field therebetween is inclined to the crystal surfaces. Preferably, the inclination of the electric field axis is the same inclination as that of the light used to read out the information stored in the device. Thus, the optical resolution of the device is not limited, as is the prior art devices, owing to the need for using inclined reading light.

It is noted that, in this embodiment, the inclination of the electric field is obtained by virtue of the offset relationship between the electrode 72 and electrode 26. Thus, the angle of the writing beam 80 is immaterial.

In one embodiment, the electrodes 72 have a thickness of about 300 A, and a diameter of 1 mil. The electrode layer 76 has a thickness of about 300 A, and the insulating layer 74 a thickness of about 1,000 A.

The various other layers of the devices shown, to the extent that similar layers are used in the prior art devices, can have the same dimensions of the prior art similar layers. By way of example, the electrode layers 18 and 20 can have a thickness of about 300 A, and the photoconductive layers 16 and 42 can have a thickness of about 10,000 A.

While the invention has been described in connection with ferroelectric materials, i.e., crystalline materials having domains which can be polarized to stable states, thus providing memory action, the invention can be used with materials not considered classical ferroelectric materials in that the polarized states are not stable, i.e., the polarized domains "relax" or return to the unpolarized state upon removal of the polarizing force. However, in that the the "relaxing" phenomenon requires some finite time, devices according to this invention using such materials have utility in systems requiring only short memories, e.g., buffer memories in computers, or display devices haing short frame time memory, e.g., television type displays. Examples of such materials are various isomorphs of the material potassium-dihydrogen-phosphate ($KH_2PO_4$). These materials, it is noted, are ferroelectric materials at temperatures below the Curie points thereof.

Also, the instant invention has utility with devices using optically addressed magneto-optic materials, such as yttrium or terbium iron garnet.

We claim:

1. An optical storage device comprising: an electro-optical body having a pair of surfaces related to the crystallographical orientation of said body such that domains within said body are polarizable between two states in rsponse to the application of an electric field through said body via said surfaces,
   the polarized state of said domains being determinable by shining light through one of said surfaces at a preselected angle other than the normal thereto,
   means, responsive to the illumination of said device, for providing an elemental electrode at each of said surfaces, said elemental electrodes providing the sole means whereby an electric field can be applied through said body,
   said elemental electrodes being so disposed relative to one another whereby the main axis of an electric field between said electrodes is disposed at said preselected angle with respect to said surface and wherein each of said surfaces has a light transmitting photoconductive material layer thereon, and each of said photoconductive layers has a transparent electrically conductive layer on the outer surface thereof.

2. An optical storage device comprising:
   an electro-optical body having a pair of surfaces related to the crystallographical orientation of said body such that domains within said body are polarizable between two states in response to the application of an electric field through said body via said surfaces,
   means, responsive to the directing of a beam of light through said body and through both said surfaces, for providing an elemental electrode at each of said surfaces, the positions of said electrodes at each of said surfaces being determined independently of one another by the surface intercepts of said beam, said elemental electrodes being the sole means whereby an electric field can be applied through said body and wherein each of said surfaces has a light transmitting photoconductive material layer thereon, and each of said photoconductive layers has a transparent electrically conductive layer on the outer surface thereof.

3. An optical storage device comprising:
   a flat member of an electro-optical material,
   a light transmitting photoconductive layer on each of the major surfaces thereof,
   a conductive layer on each of said photoconductive layers, at least one of said conductive layers being transparent, and
   means for directing light onto said member through said transparent conductive layer for writing information into said device and for detecting the information written therein.

4. An optical storage device comprising:
   a flat member of an electro-optical material,
   a light transmitting photoconductive layer on each of the major surfaces thereof, and
   a conductive layer on each of said photoconductive layers, at least one of said conductive layers being transparent.

5. A device as in claim 4 wherein both of said conductive layers are transparent.

6. A device as in claim 4 wherein the surface facing said member of the other of said conductive layers is light reflecting.

* * * * *

UNITED STATES PATENT OFFICE
CERTIFICATE OF CORRECTION

Patent No. 3,747,075           Dated  July 17, 1973

Inventor(s)   Scott Allen Keneman and George W. Taylor

It is certified that error appears in the above-identified patent and that said Letters Patent are hereby corrected as shown below:

Column 2, line 19, change "between" to ---the particular state depending upon---. Column 8, line 43, after on, insert ---the outer surface of---; and line 54, after on, insert ---the outer surface of---.

Signed and sealed this 6th day of August 1974.

(SEAL)
Attest:

McCOY M. GIBSON, JR.
Attesting Officer

C. MARSHALL DANN
Commissioner of Patents